US007696621B2

(12) United States Patent
Arms et al.

(10) Patent No.: US 7,696,621 B2
(45) Date of Patent: Apr. 13, 2010

(54) RFID TAG PACKAGING SYSTEM

(75) Inventors: Steven W. Arms, Williston, VT (US); Michael J. Hamel, Essex Junction, VT (US)

(73) Assignee: MicroStrain, Inc., Williston, VT (US)

( * ) Notice: Subject to any disclaimer, the term of this patent is extended or adjusted under 35 U.S.C. 154(b) by 199 days.

(21) Appl. No.: 11/825,404

(22) Filed: Jul. 5, 2007

(65) Prior Publication Data

US 2008/0009149 A1 Jan. 10, 2008

Related U.S. Application Data

(60) Provisional application No. 60/818,567, filed on Jul. 5, 2006, provisional application No. 60/819,159, filed on Jul. 7, 2006.

(51) Int. Cl.
*G01L 7/00* (2006.01)

(52) U.S. Cl. ............................ 257/728; 257/7; 428/68; 428/76

(58) Field of Classification Search .................. 428/68, 428/76; 257/701, 728, 7
See application file for complete search history.

(56) References Cited

U.S. PATENT DOCUMENTS

| | | | | |
|---|---|---|---|---|
| 5,337,605 | A * | 8/1994 | Schultz et al. | 73/335.02 |
| 5,760,465 | A * | 6/1998 | Alcoe et al. | 257/669 |
| 5,877,043 | A * | 3/1999 | Alcoe et al. | 438/123 |
| 6,054,961 | A * | 4/2000 | Gong et al. | 343/713 |
| 6,717,819 | B1 * | 4/2004 | Chung | 361/760 |
| 6,841,855 | B2 * | 1/2005 | Jaeck et al. | 257/668 |
| 7,014,888 | B2 * | 3/2006 | McDonald et al. | 427/558 |
| 7,109,055 | B2 * | 9/2006 | McDonald et al. | 438/51 |
| 7,225,678 | B2 * | 6/2007 | Kandler et al. | 73/715 |
| 2004/0118214 | A1 * | 6/2004 | McDonald et al. | 73/756 |
| 2005/0206503 | A1 * | 9/2005 | Corrado et al. | 340/10.5 |
| 2006/0000541 | A1 * | 1/2006 | Hager et al. | 156/66 |
| 2006/0228830 | A1 * | 10/2006 | Lin | 438/109 |
| 2006/0278965 | A1 * | 12/2006 | Foust et al. | 257/678 |
| 2008/0237840 | A1 * | 10/2008 | Alcoe et al. | 257/706 |
| 2009/0051540 | A1 * | 2/2009 | Fu et al. | 340/572.7 |

OTHER PUBLICATIONS

Gao, R. and Zhang, L., "Micromachined Microsensors for Manufacturing," IEEE Instrumentation & Measurment Magazine, Jun. 2004.
Chevalerias, O. et al., "Inductive Telemetry of Multiple Sensor Modules," Pervasive Computing, Jan.-Mar. 2005.

* cited by examiner

*Primary Examiner*—Gary F. Paumen
(74) *Attorney, Agent, or Firm*—James Marc Leas

(57) ABSTRACT

An electronic packaging system includes an electronic device. The electronic packaging system also includes a flexible material located adjacent a plurality of sides of the electronic device. The electronic device is located in a cavity in the flexible material. The flexible material has a first height and a first width. The electronic device has a second height. The first height is greater than the second height and the first width is greater than the first height so the flexible material protects the electronic device from loading.

55 Claims, 19 Drawing Sheets

RFID TAG PACKAGING SYSTEM

RELATED APPLICATIONS

This patent application claims the benefit of Provisional Patent Applications 60/818,567, filed Jul. 5, 2006 and 60/819,159, filed Jul. 7, 2006, both entitled "RFID Tag Packaging System," and both incorporated herein by reference.

This provisional patent application is related to commonly assigned U.S. Pat. No. 6,529,127, "System for Remote Powering," issued Mar. 4, 2003, incorporated herein by reference.

This application is also related to the following commonly assigned U.S. Patent Applications, all of which are incorporated herein by reference:

Data collection and Storage Device, U.S. patent application Ser. No. 09/731,066, filed Dec. 6, 2000.

Energy Harvesting for Wireless Sensor Operation and Data Transmission, U.S. patent application Ser. No. 10/379,223, filed Mar. 5, 2003.

Shaft Mounted Energy Harvesting for Wireless Sensor Operation and Data Transmission, U.S. patent application Ser. No. 10/769,642, filed Jan. 31, 2004.

Robotic system for powering and interrogating sensors, U.S. patent application Ser. No. 10/379,224, filed Mar. 5, 2003.

Structural damage detection and analysis system, U.S. Provisional Patent Application No. 60/729,166, filed Oct. 21, 2005.

Wireless Vibrating Strain Gauge for Smart Civil Structures, U.S. patent application Ser. No. 11/431,194, filed May 10, 2006.

High Speed Energy Harvesting Data Acquisition System, U.S. Provisional Patent Application No. 60/715,987, Sep. 9, 2005.

Sensor Powered Event Logger, U.S. Provisional Patent Application No. 60/753,481, Dec. 21, 2005.

Method for Integrating an energy harvesting circuit into a PZ element's electrodes, U.S. Provisional Patent Application No. 60/753,679, Dec. 21, 2005.

Method for Integrating an energy harvesting circuit into a PZ element's electrodes, U.S. Provisional Patent Application No. 60/762,632, Jan. 26, 2006.

BACKGROUND

RFID tags and other electronic devices, such as those for stimulating or sensing, may be located on substrates, such as pipes, girders, I-beams, vehicles, bridges, buildings, machinery, and other structures, to provide identification or to check for cracks, delamination, corrosion, or other degradation or damage.

No satisfactory scheme has been implemented to provide adequate protection for the electronic devices when mounted on structures subject to mechanical stress, such as from the load experienced when pipes bang together on the electronic device. Hard surfaced packages can be crushed or sheared off the pipe. Adding to expense, different hard surfaced packages may be needed for mounting to pipes or other surfaces that have different curvatures. Without adequate protection, RFID tags and other electronic devices can be damaged and rendered inoperable while attached to the structure. Thus a better scheme is needed to reduce or eliminate the loading on electronic devices, while providing sufficient flexibility for mounting to surfaces of different shape, and this scheme is provided by this patent application.

SUMMARY

One aspect of the present patent application is an electronic packaging system that includes an electronic device and an array of surface elements surrounding the electronic device. A plurality of the surface elements of the array have a first height. The electronic device has a second height. The first height is greater than the second height so the array of surface elements protects the electronic device from loading.

Another aspect of the present patent application is a protective system, comprising a hard cap and a gel. The gel is within the hard cap. The hard cap has an opening for allowing the gel to leave when pressure is applied to the hard cap.

Another aspect of the present patent application is an electronic packaging system that includes an electronic device, a first flexible backing, a second flexible backing, and an array of surface elements. A first portion of the array surrounds the electronic device and is mounted to the first backing. A second portion of the array surrounds the electronic device and is mounted to the second backing. The first portion of the array is interlocked with the second portion of the array.

Another aspect of the present patent application is an electronic packaging system, comprising an electronic device and a first flexible member. The first flexible member includes a first portion of an array of surface elements and a first flexible backing. The first portion of the array of surface elements is integral with the first flexible backing and surrounds the electronic device.

BRIEF DESCRIPTION OF THE DRAWINGS

The foregoing will be apparent from the following detailed description, as illustrated in the accompanying drawings, in which:

FIGS. 2*d*', 2*e*', 2*f*', 2*g*', and 2*h*' correspond to FIGS. 2*d*, 2*e*, 2*f*, 2*g*, and 2*h* except that the first and second dual lock materials are shown pushed fully together so mushroom stems contact front surfaces of corresponding insulating carriers;

FIG. 8*a*' is a cross sectional view of the double layer flexible protective package of FIG. 8*a* but the first and second dual lock materials are shown pushed fully together so mushroom stems contact front surfaces of corresponding insulating carriers.

DETAILED DESCRIPTION

The present patent application provides a flexible packaging system that vastly reduces or eliminates loading that can otherwise cause damage to electronic devices mounted to pipes, girders, I-beams, vehicles, bridges, buildings, machinery, and other structures. The electronic devices can include RFID tags, sensors, and/or actuators. It can include a microprocessor and memory for storing programs or data. It can be passive or active. The active device can be a wireless communications device, such as an RF transmitter, receiver, or transceiver. Alternatively the active device can include an optical transmitter or an acoustic transmitter. Various other electronic components can also be included, such as an A/D converter, an amplifier, a filter, a power supply, and a voltage regulator, as shown in the above mentioned commonly assigned patent applications incorporated herein by reference.

A large number of electronic devices can be provided on one or more substrates. For example one electronic device can be located on each pipe section of a large number of pipe sections stored for use in oil drilling or in an oil pipeline. The present patent application provides a flexible packaging technique for an RFID tag or other electronic device to be mounted on each pipe section and for those devices to survive intact while the pipe sections are roughly handled and harshly banged against each other or banged against other equipment. The technique provides a flexible package so the same package can be used regardless of the diameter of the pipe.

In this application "on" a substrate means on a surface of the substrate. "On" a substrate also means embedded within the substrate. Thus, a module mounted on a surface of a pipeline is mounted on the pipeline. A module located embedded within concrete is still considered to be mounted on the concrete.

Figure 1A:
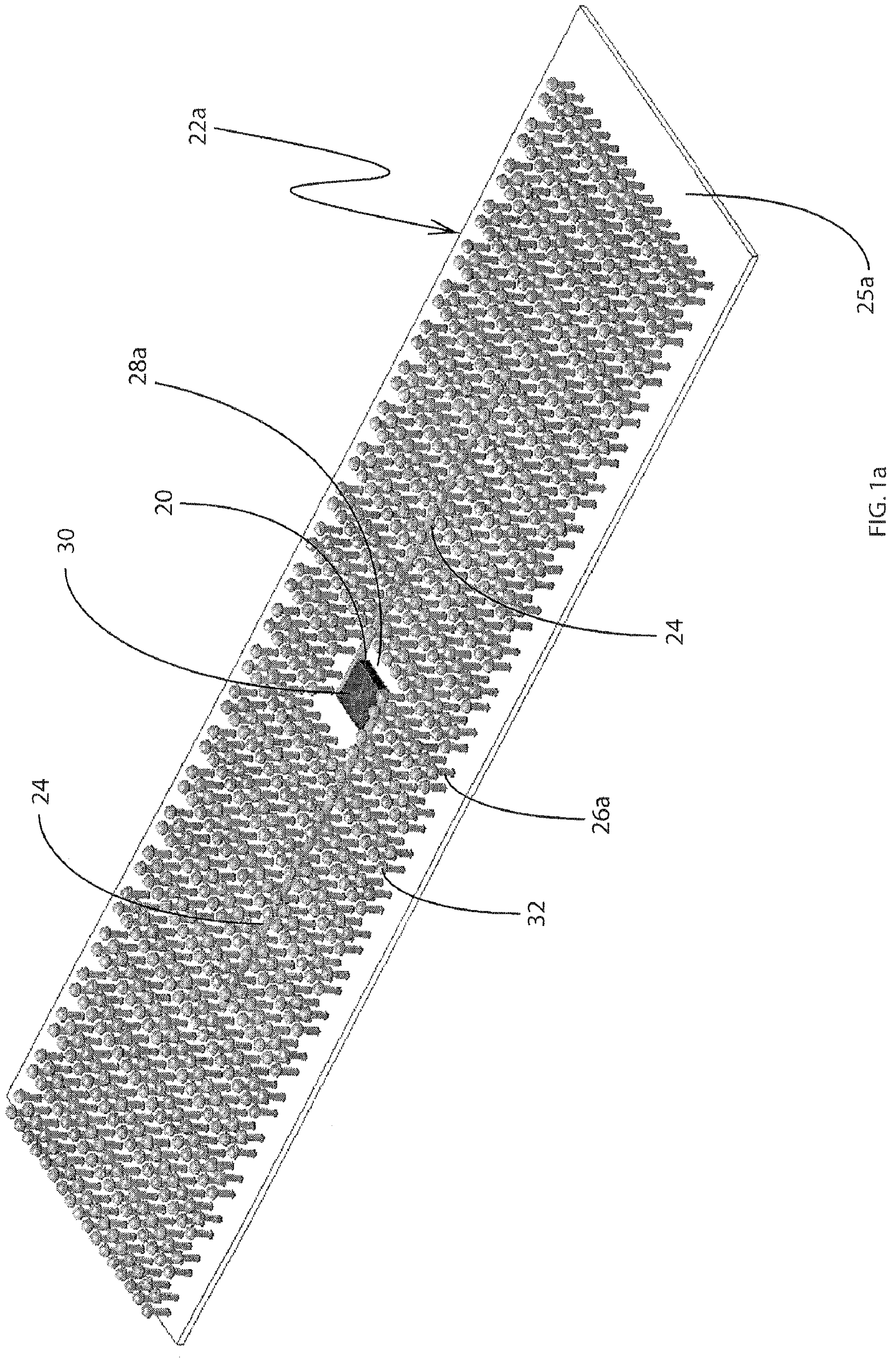
FIG. 1*a* is a three dimensional view of a first layer of a flexible protective package for an electronic device.
Figure 1B:
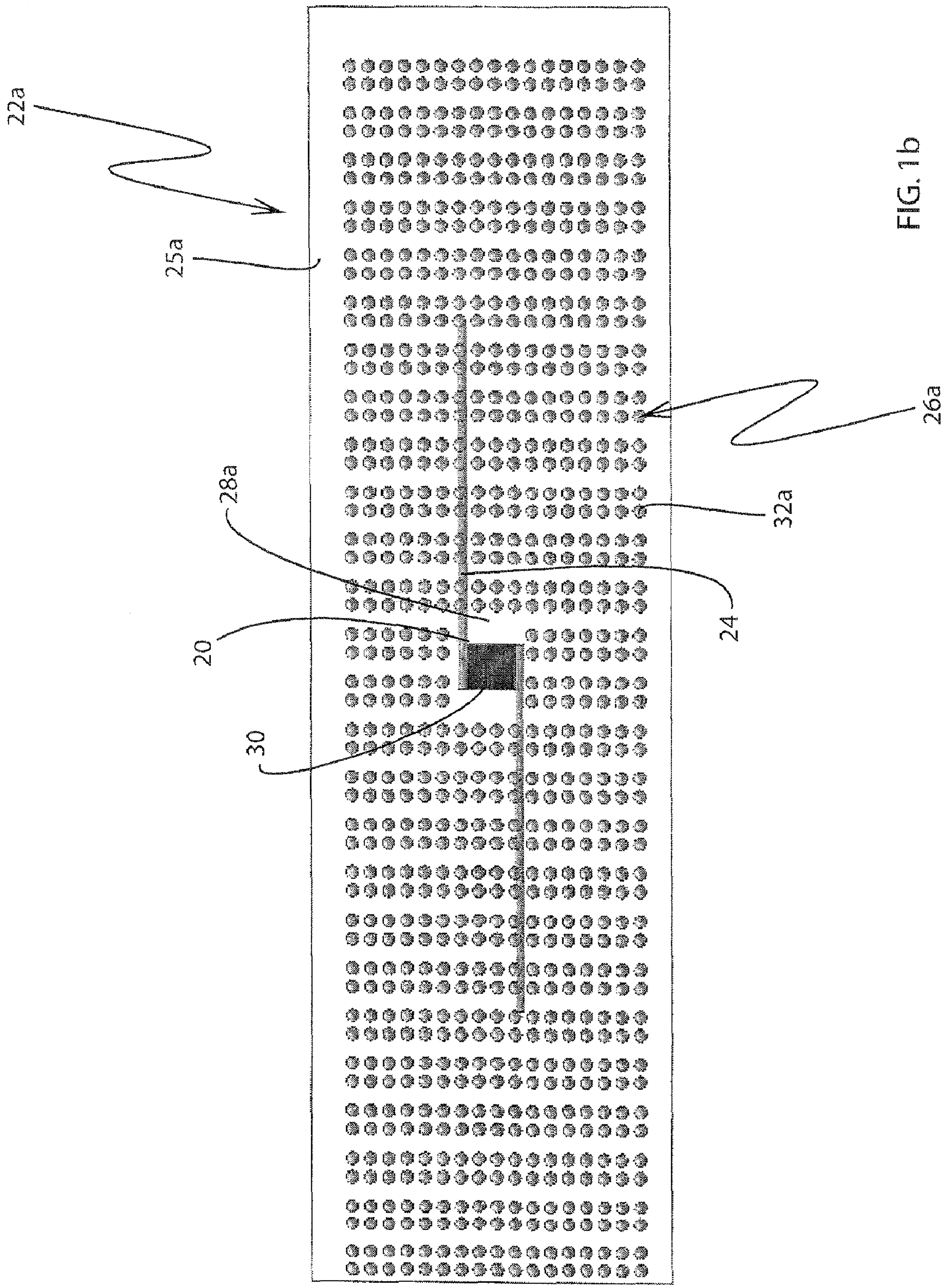
FIG. 1*b* is a top view of the flexible protective package of FIG. 1.
Figure 1C:
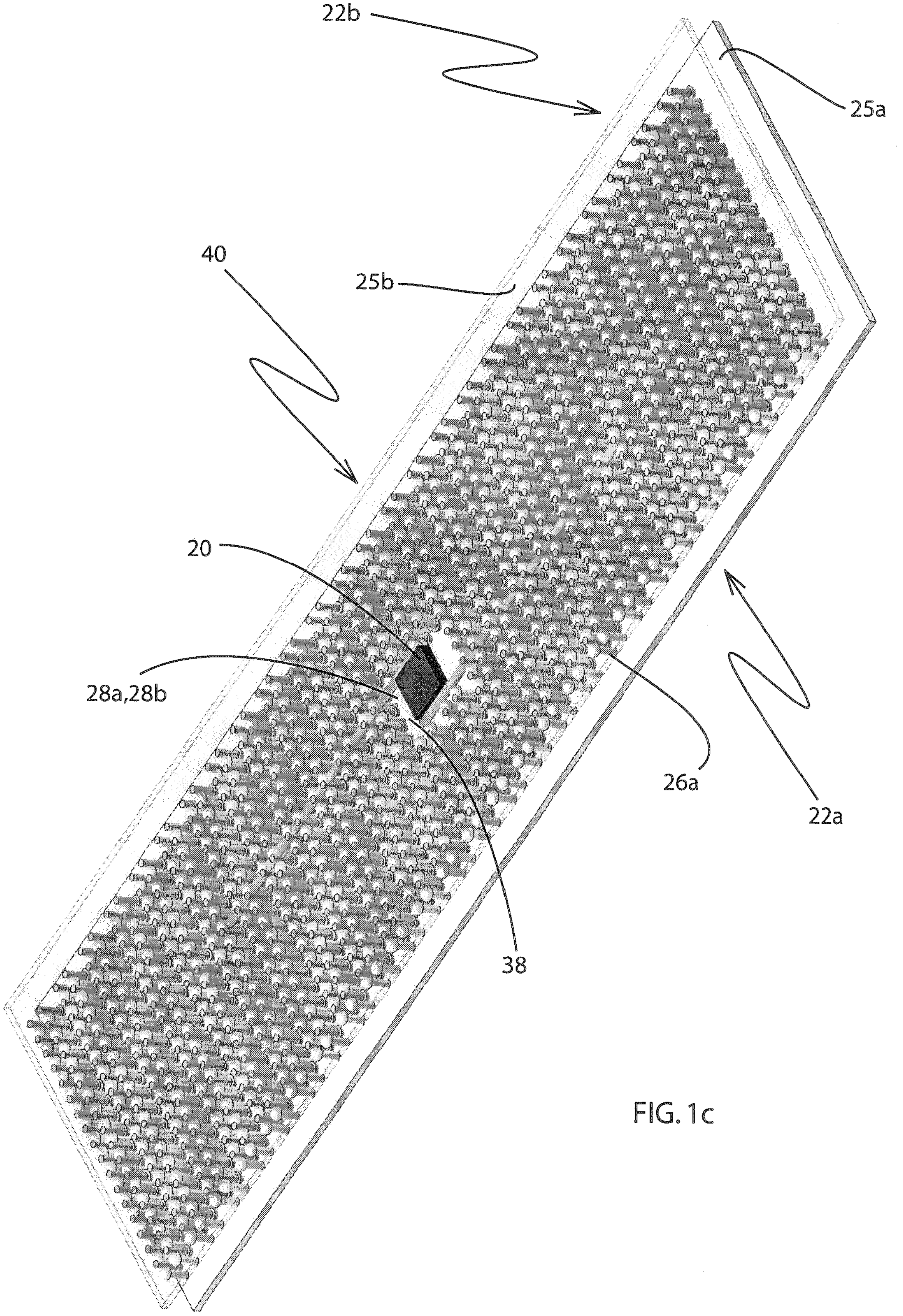
FIG. 1*c* is a three dimensional view of two layers of a flexible protective package for an electronic device.

In one embodiment electronic device 20 was mounted on first 3M Dual Lock Reclosable Fastener SJ3541 ("dual lock material") 22*a*, available from 3M company, St. Paul, Minn., as shown in FIGS. 1*a*, 1*b*, 1*c*. Electronic device 20 can be an RFID chip, a sensor, an actuator, or any other electronic device. In one experiment antennas 24 were soldered to RFID chip 20 which was then placed on planar backing 25*a* of first dual lock material 22*a* with antennas 24 extending between mushroom stems 26 of first dual lock material 22*a*, as shown in FIGS. 1*a*, 1*b*. Chip 20 can be protected with UV cureable encapsulant 27.

Figure 1D:
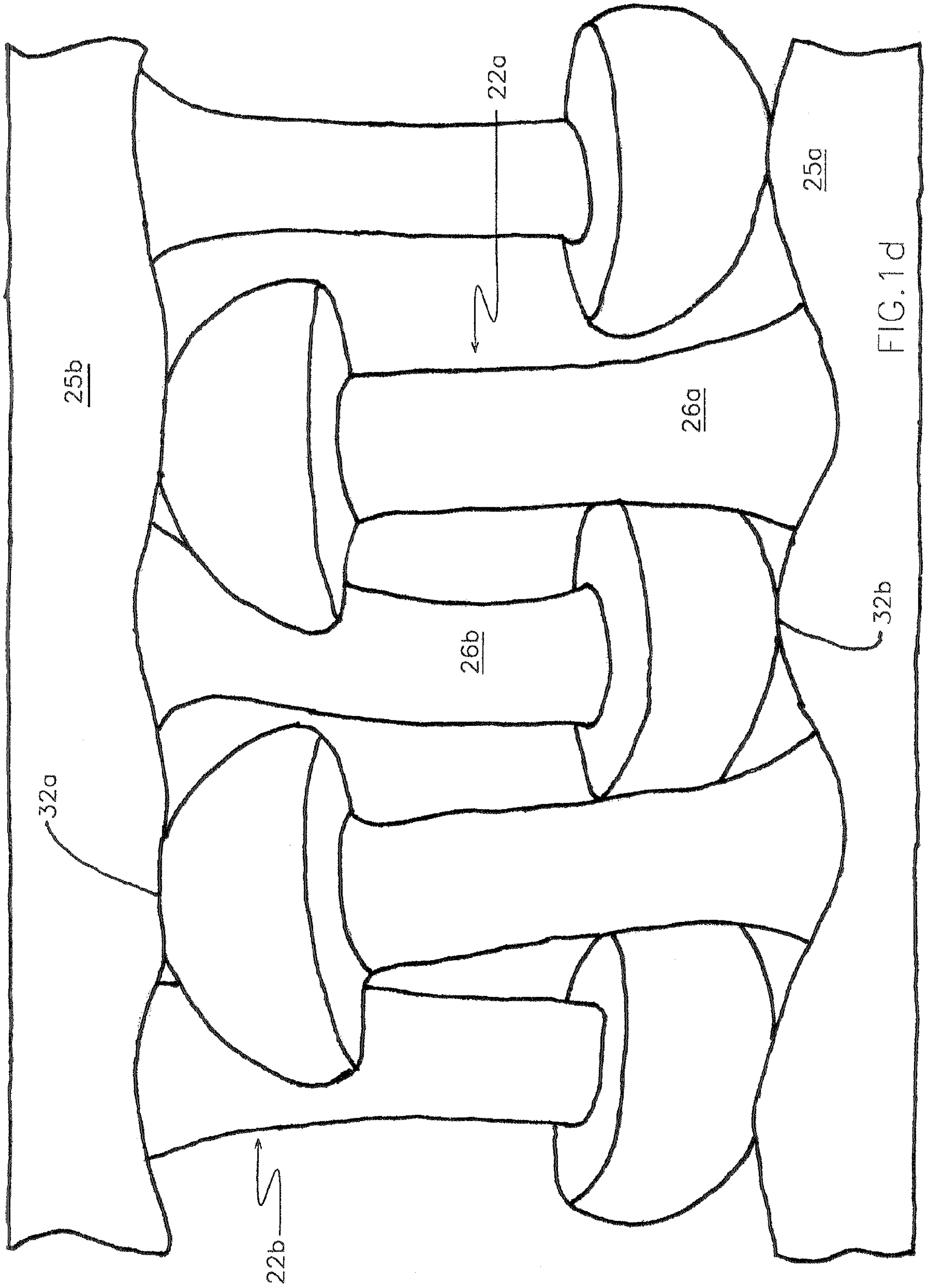
FIG. 1*d* is a side view of a drawing of a photograph of two layers of the interlocking flexible material used for the protective package of FIG. 1*c;*

A line drawing of a photograph of dual lock material 22*a*, 22*b* in FIG. 1*d* shows interlocking mushroom stems 26*a*, 26*b* of first and second dual lock materials 22*a*, 22*b* pressed against opposite planar backings 25*a*, 25*b*. So pushed together, interlocking mushroom stems 26*a*, 26*b* resist further compression.

Mushroom stems 26*a* of first dual lock material 22*a* had previously been cut off in region 28*a* of first dual lock material 22*a*, as shown in FIG. 1*b* so top surface 30 of RFID chip 20 was substantially below top surface 32*a* of mushroom stems 26*a*. The cutting was accomplished with a razor blade but mushroom stems 26*a* can also be removed in selected regions with a machine tool, such as an end mill.

Antennas 24 were fabricated of copper wire but they could be fabricated of a flexible conductor that does not easily corrode, such as tin, tinned copper, aluminum, gold, beryllium copper, NiTi, silver, conductive epoxy, conductive elastomer, and conductive ink. NiTi is a superelastic material. Antennas 24 can also be fabricated of a conductive tape or be formed using standard flex printed circuit fabrication techniques of a conductive copper on an insulating flex material, such as polyimide.

In this embodiment, second dual lock material 22*b* can also have its mushroom stems cut off in region 28*b* of electronic device 20, as shown in FIG. 1*c*, and second dual lock material 22*b* can be pressed on to first dual lock material 22*a* to form cavity 38 around electronic device 20 and to form protective package 40 for electronic device 20. In protective package 40 the array of interlocking mushroom stems 26*a*, 26*b* surrounding electronic device 20 substantially prevents transfer of impact force to electronic device 20.

Any small electronic device could be used in the place of electronic device 20. In an experiment, a very sensitive pressure sensor was used in place of electronic device 20. The pressure sensor was wirelessly connected to an oscilloscope to display the force. The pressure sensor was first shown to be sensitive to tiny forces exerted by slight finger pressure, on the order of grams of force. With the pressure sensor in place in interlocking first and second dual lock materials 22*a*, 22*b* which was adhesively connected to a first pipe, protective package 40 was subjected to repeated blows from a second pipe. The oscilloscope showed that the pressure sensor experienced no measurable pressure from any of the blows of one pipe slamming into the other. Only when a sharp edge of one pipe was jammed onto the region of the pressure sensor was a pressure detected. When protective package 40 was later disassembled the pressure sensor continued to be sensitive to slight pressure from a finger, demonstrating that it continued to function normally and that protective package 40 successfully protected it from the blows.

Figure 2B:
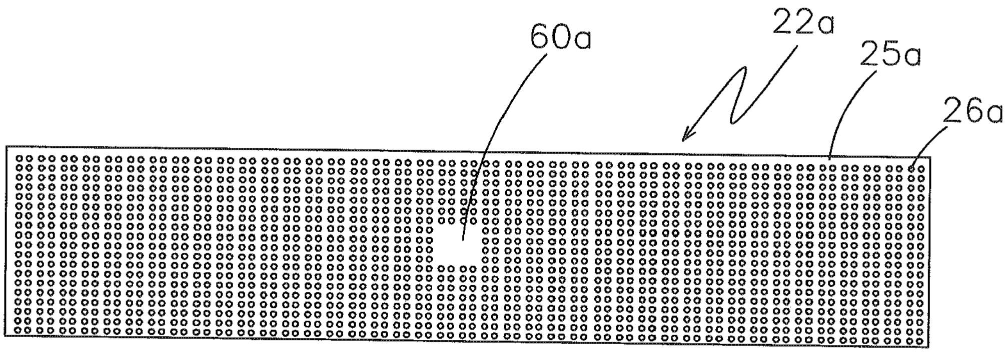
FIG. 2*b* is a top view of the flexible protective package with a hole cut in the interlocking flexible material.
Figure 2A:
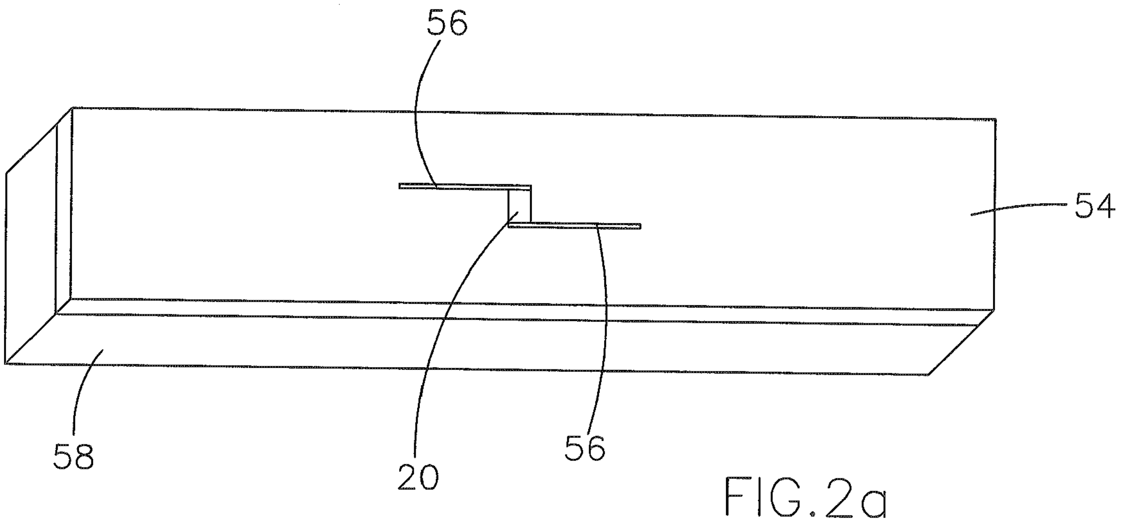
FIG. 2*a* is a three dimensional view of an electronic device mounted on a sheet of insulating carrier that has antennas 56 previously patterned thereon and that is mounted on a pad to provide additional spacing for the antennas from a metal substrate.

In another embodiment, electronic device 20 is mounted on a sheet of insulating carrier 54*a*, such as polyimide that may have antennas 56 previously patterned thereon, as shown in FIG. 2*a*. Insulating carrier 54*a* can be mounted on pad 58 to provide additional spacing for antenna 56 from a metal substrate, such as a pipe, to which pad 58 is mounted. Pad 58 can simply be an adhesive or it can include another layer of polyimide with layers of adhesive on either side.

Figure 2C:
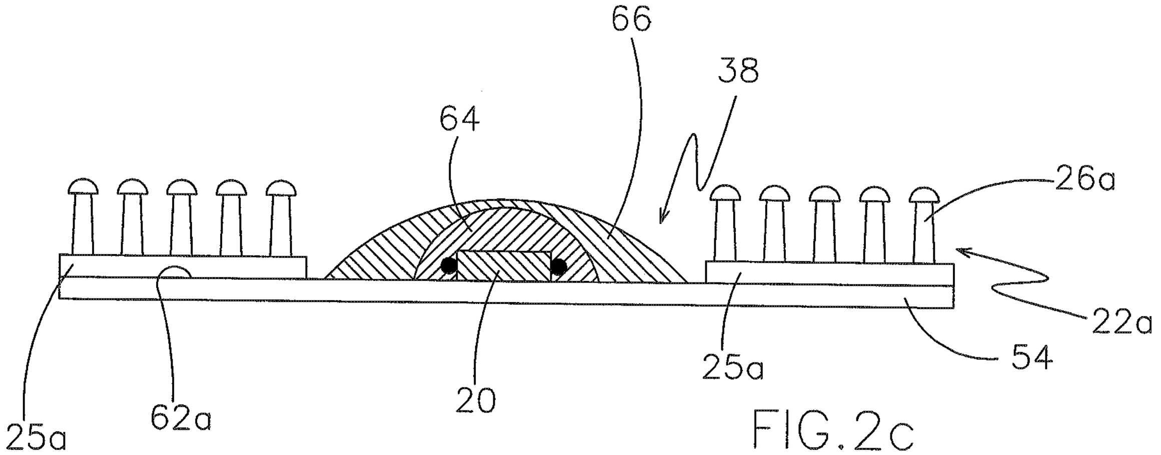
FIG. 2*c* is a cross sectional view of the flexible protective package with a protected electronic device mounted on a sheet of insulating carrier extending through the hole cut in the interlocking flexible material of FIG. 2*b;*

Hole 60*a* is cut in dual lock material 22*a*, removing both mushroom stems 26*a* and planar backing 25*a* of first dual lock material 22*a* in hole 60*a*, as shown in FIG. 2*b*. Hole 60*a* is sized to allow electronic device 20 mounted on sheet of insulating carrier 54*a* to be inserted there through while sheet of insulating carrier 54*a* is adhesively attached to back surface 62*a* of planar backing 25*a* of first dual lock material 22*a*, as shown in FIG. 2*c*. Adhesive available on back surface 62*a* of planar backing 25*a* first dual lock material 22*a* can be used for this purpose.

Protective wax or butyl rubber 64 can be provided on electronic device 20 to protect electronic device 20 from moisture that the structure to which the package is mounted may experience, as also shown in FIG. 2*c*. A second layer of polyurethane material 66 or another such material can be used for additional shock protection.

Figure 2D:
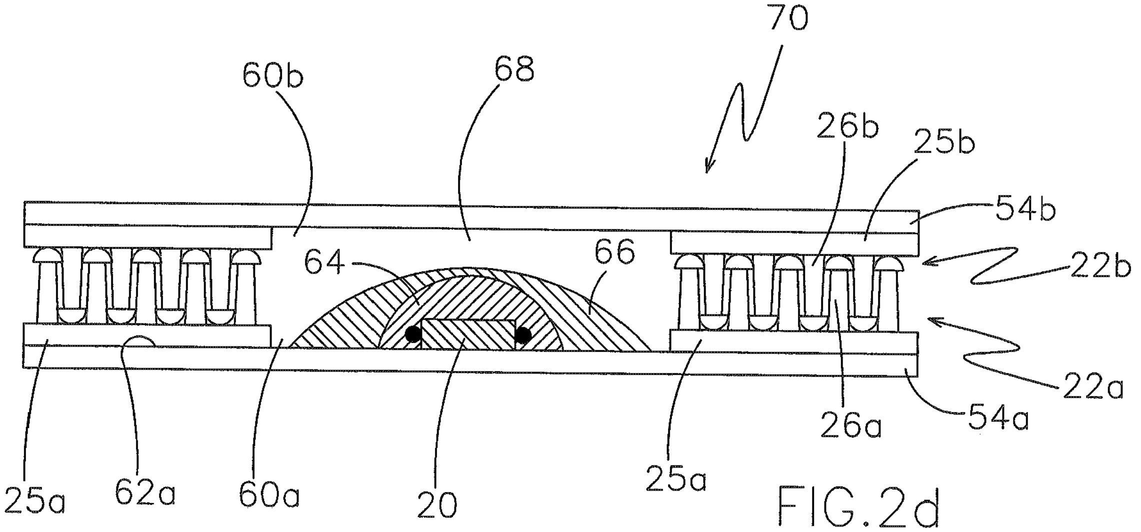
FIG. 2*d* is a cross sectional view of the flexible protective package of FIG. 2*c* with the second layer of interlocking flexible material attached.

Second dual lock material 22*b*, with mushroom stems 26*b* cut off or with its own hole 60*b* is then pressed on to first dual lock material 22*a* to form cavity 68 around electronic device 20 and to form protective package 70 for electronic device 20, as shown in FIG. 2*d*. In protective package 70 the array of interlocking mushroom stems 26*a*, 26*b* surrounding electronic device 20 substantially prevents transfer of impact force to electronic device 20.

Figure 2E:
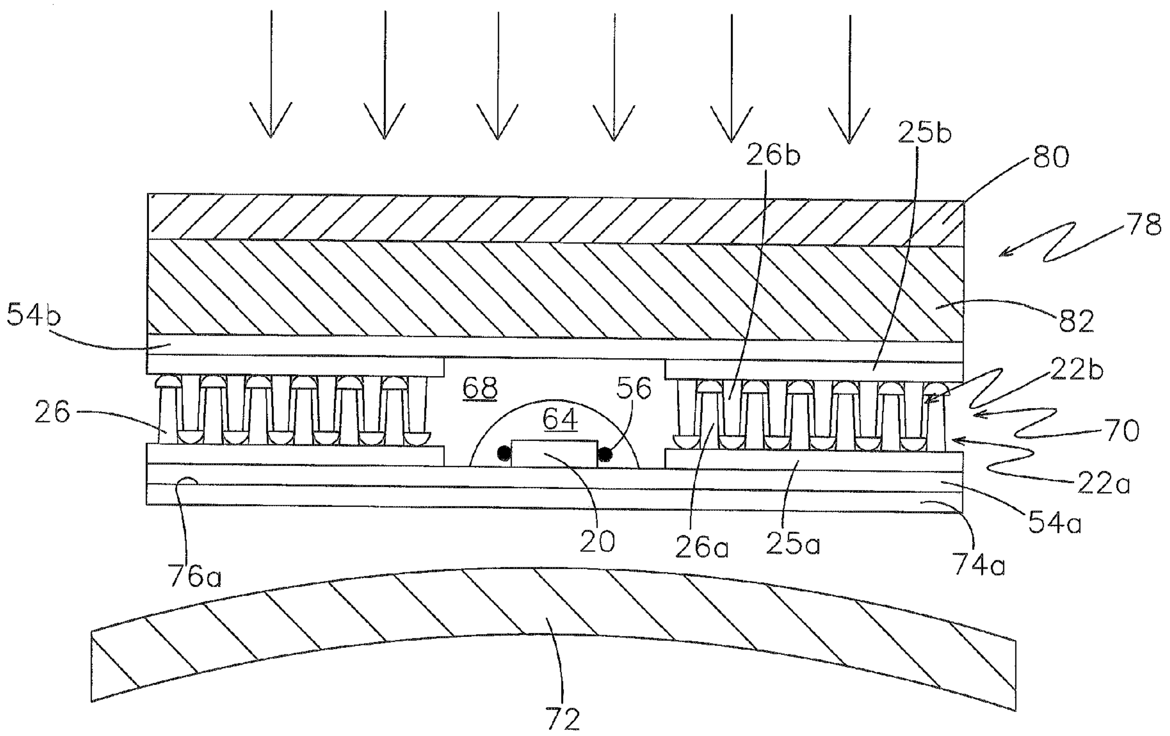
FIG. 2*e* is a cross sectional view of the double layer flexible protective package of FIG. 2*d* being pressed for adhesion to a pipe.
Figure 2F:
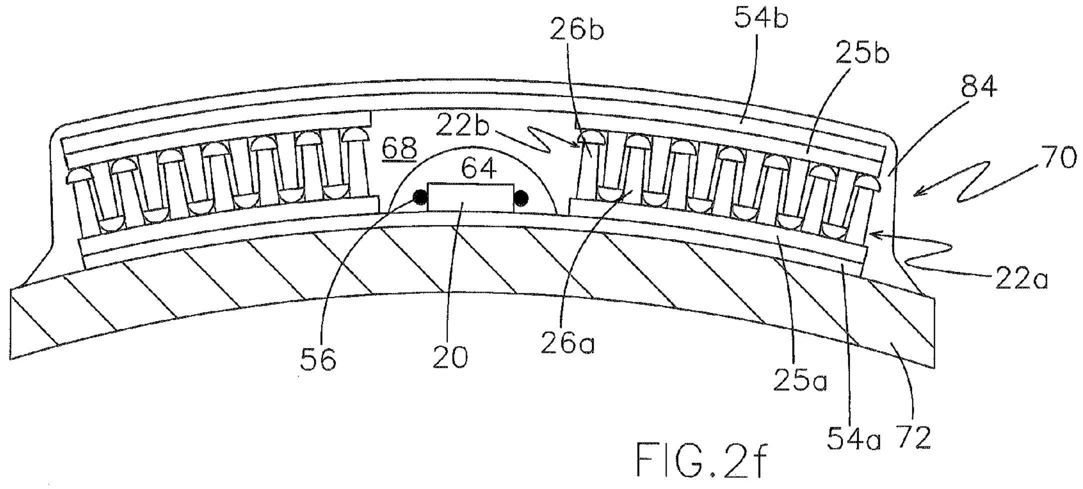
FIG. 2*f* is a cross sectional view of the double layer flexible protective package of FIG. 2*e* after adhesive attachment to the pipe and after a sealant layer has been applied.

Protective package 70 is mounted to pipe 72, as shown in FIG. 2*e*. Layer of adhesive 74*a* provided on back surface 76*a* of insulating carrier 54*a* is pressed against pipe 72 with driver 78. Adhesive 74*a* can be a pressure sensitive adhesive. An epoxy can also be used. Driver 78 includes hard layer 80 and soft rubber pad 82 to provide the force on flexible protective package 70 to adhere it to curved pipe 72. Spray on sealant layer 84, such as urethane, can then be applied, as shown in FIG. 2*f*.

Figure 2G:
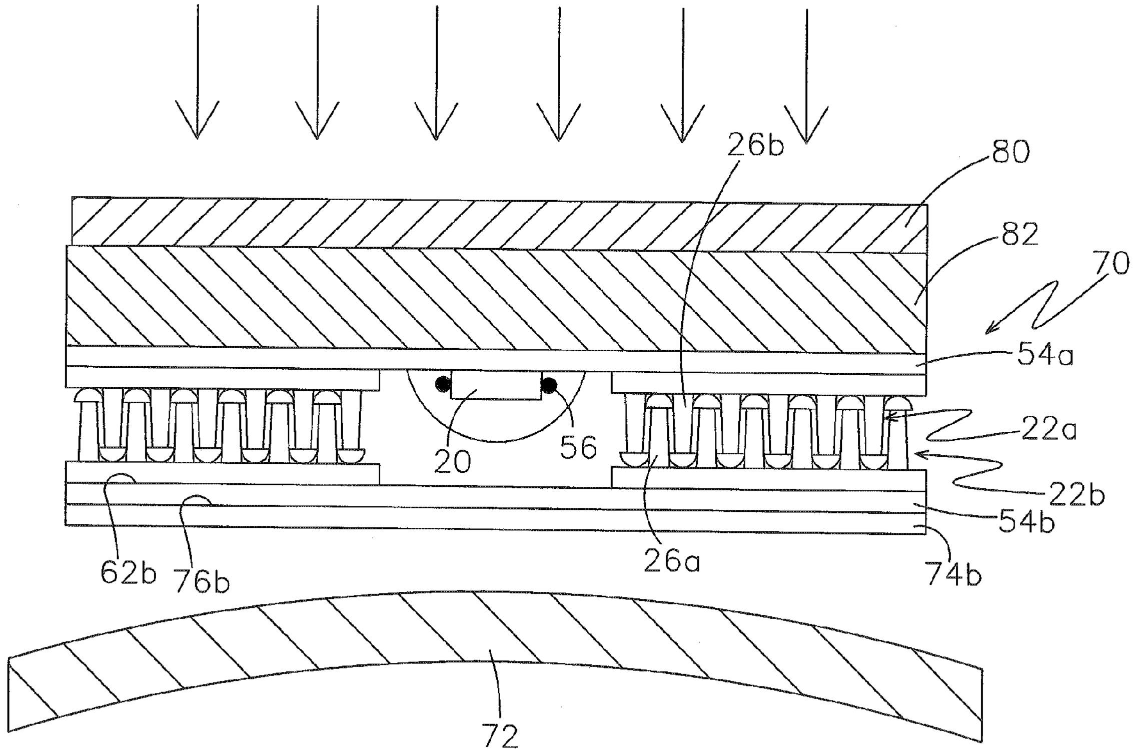
FIG. 2*g* is a cross sectional view of the double layer flexible protective package of FIG. 2*e* but with the electronic device located on the layer away from the pipe.
Figure 2H:
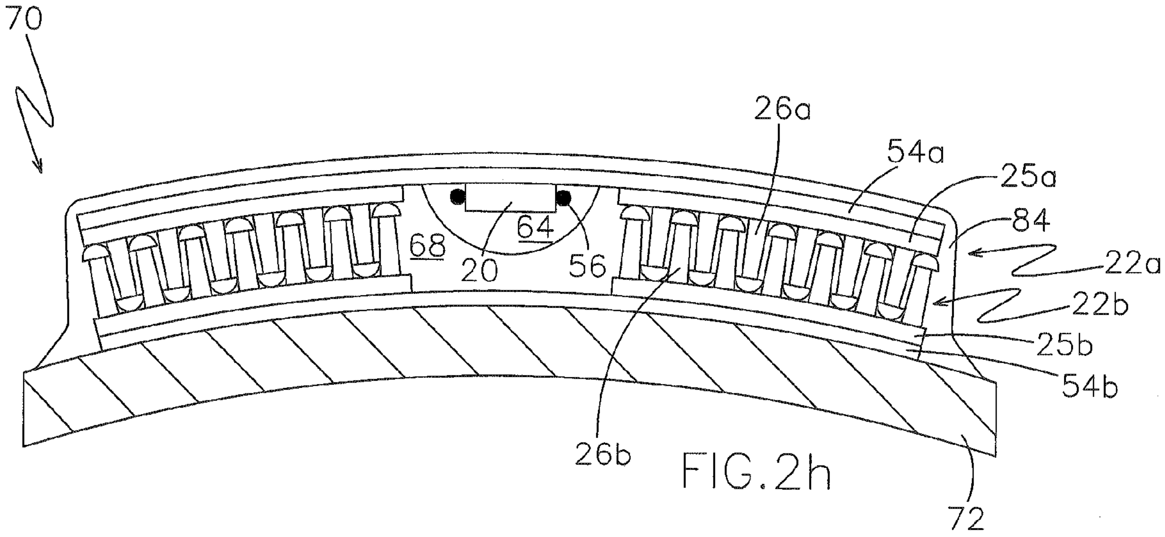
FIG. 2*h* is a cross sectional view of the double layer flexible protective package of FIG. 2*g* after adhesive attachment to the pipe and after a sealant layer has been applied.
Figure 2D:
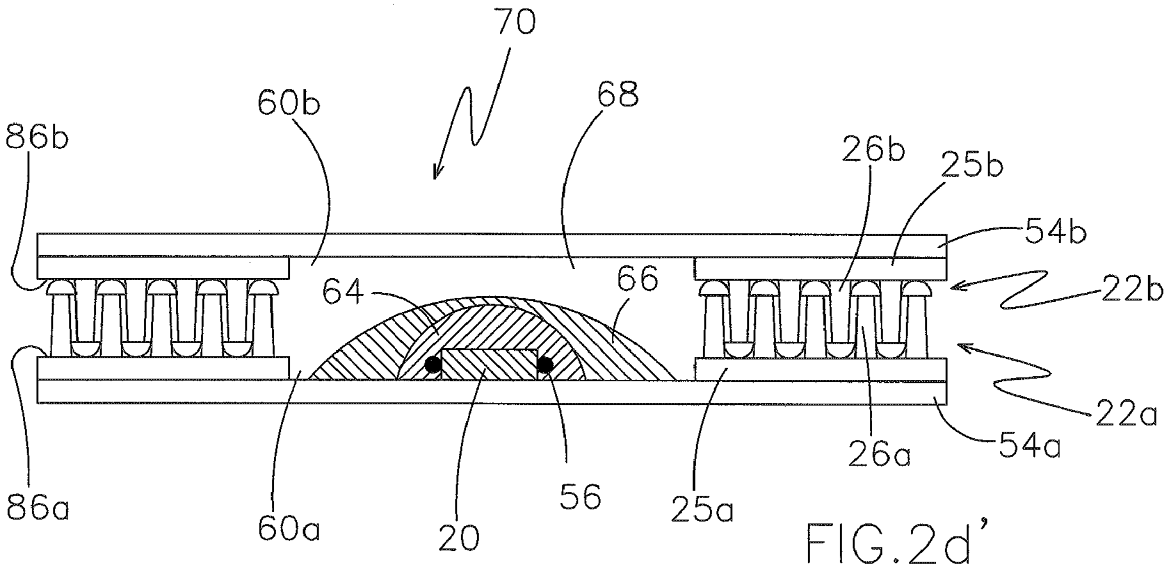
Figure 2E:
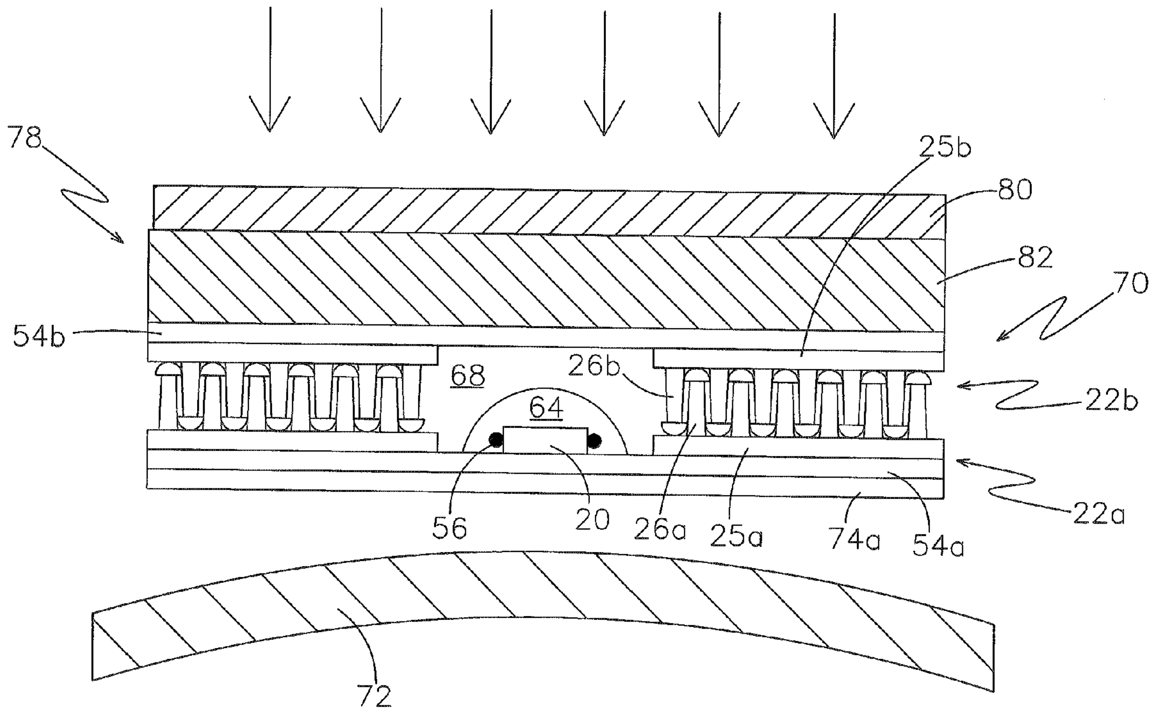
Figure 2F:
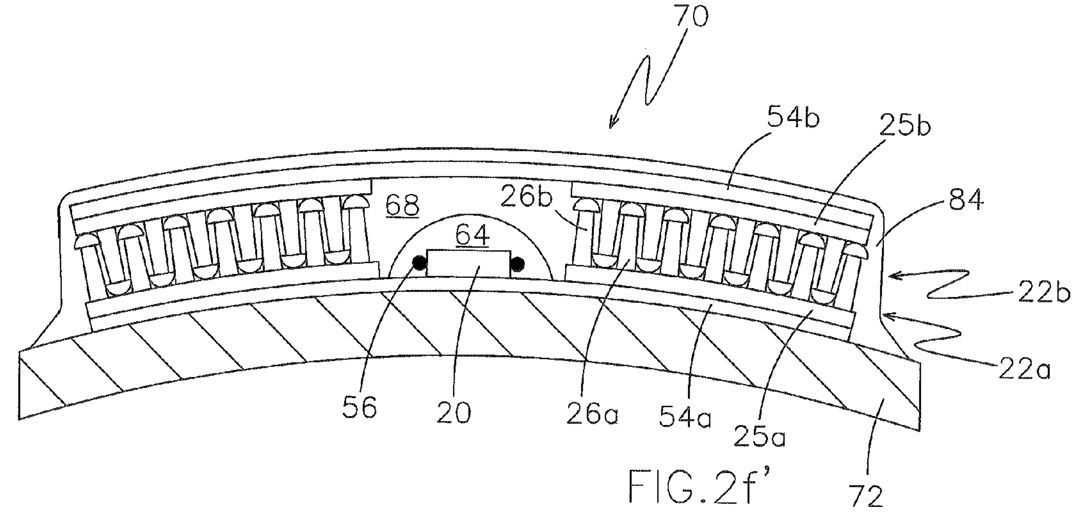
Figure 2G:
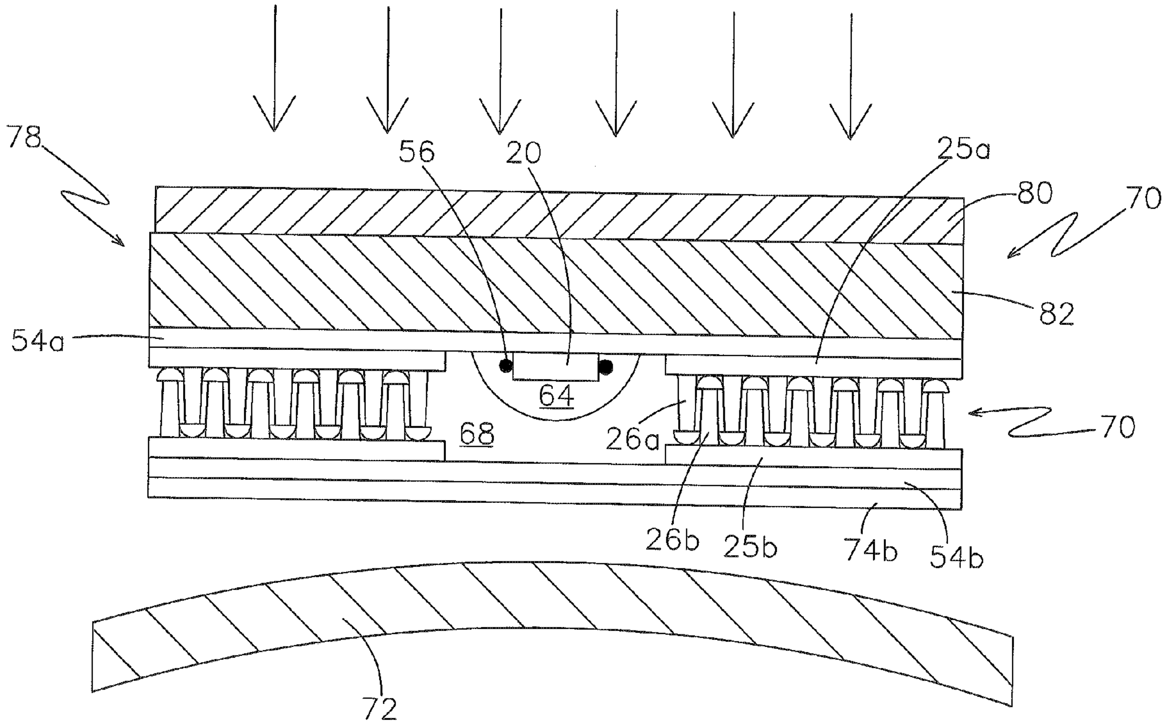
Figure 2H:
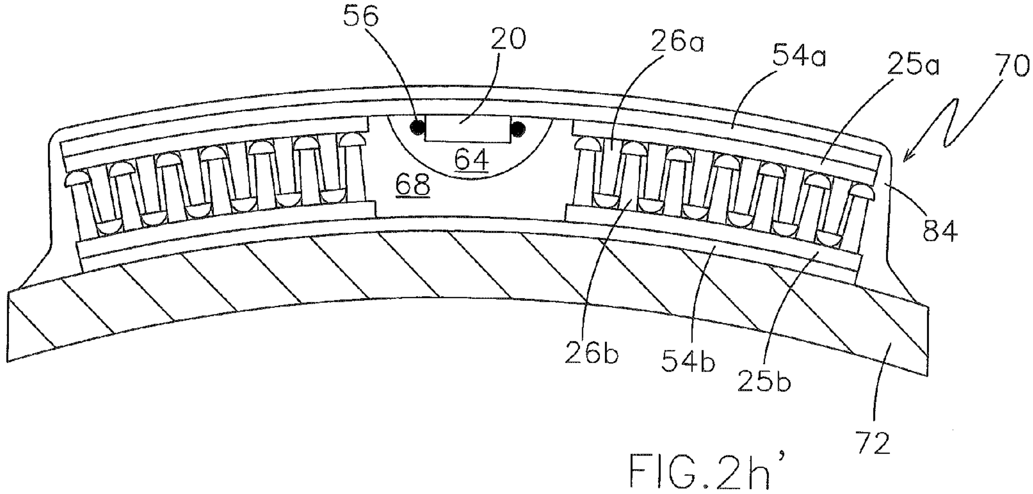

Protective package 70 can be mounted to pipe 72 upside down, as shown in FIG. 2*g*. Layer of adhesive 74*b* is provided on back surface 62*b* of planar backing 25*b* of second dual lock material 22*b*. Alternatively, if insulating layer 54*b* is provided on back surface 62*b* of planar backing 25*b*, layer of adhesive 74*b* is provided on back surface 76*b* of insulating layer 54*b*. Spray on sealant layer 84 can be applied, as shown in FIG. 2*h*.

FIGS. 2*d*', 2*e*', 2*f*', 2*g*', and 2*h*' correspond to FIGS. 2*d*, 2*e*, 2*f*, 2*g*, and 2*h* except that first and second dual lock materials 22*a*, 22*b* are shown pushed fully together so mushroom stems 26*a*, 26*b* contact front surfaces 86*a*, 86*b* of corresponding planar backing 25*a*, 25*b* of first and second dual lock materials 22*a*, 22*b*. In this position mushroom stems 26*a*, 26*b* strongly resist further compression of dual lock materials 22*a*, 22*b*, providing excellent protection to electronic device 20 in cavity 68.

Figure 3:
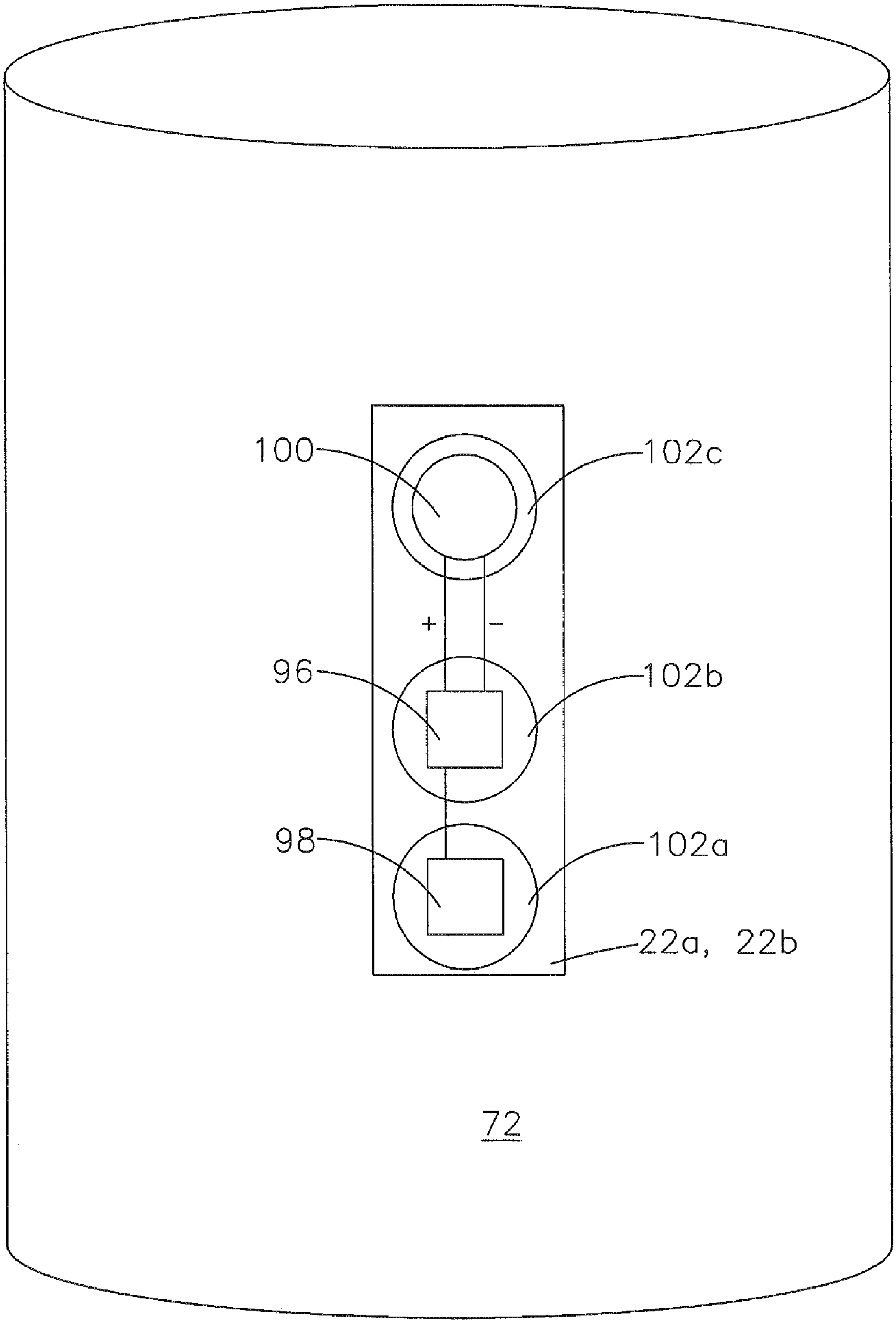
FIG. 3 is a three dimensional view of several connected electronic devices mounted in separate cavities in the flexible protective package of the present patent application and mounted on a pipe.

Several electronic components can be mounted using this technique. For example, active RF transceiver 96, fractal antenna 98, and battery 100 are each mounted in their own cavity 102*a*, 102*b*, 102*c* within first and second dual lock materials 22*a*, 22*b* mounted on pipe 72, as shown in FIG. 3. Although a single cavity can be used, the presence of interlocking mushroom stems 26*a*, 26*b* (see FIGS. 2*f*, 2*h*, 2*f*', and 2*h*') between each component 96, 98, 100 provides additional strength and resistance to compressive force as compared to providing all components in a single cavity.

Figure 4:
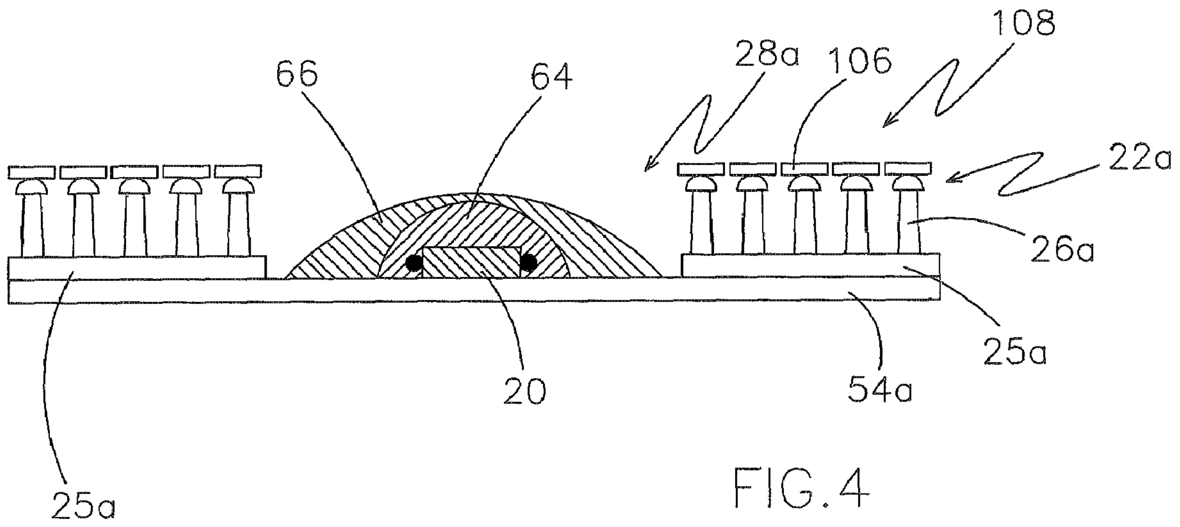
FIG. 4 is a cross sectional view of a single dual lock material 22*a* used to provide protection for electronic device 20 with adhesive provided on each mushroom stem to adhesively connect each mushroom stem 26*a* to a substrate.

A single dual lock material 22*a* can also be used to provide excellent protection for electronic device 20. In this embodiment, adhesive 106 is provided on each mushroom stem 26*a* to adhesively connect each mushroom stem 26*a* to pipe 72, as shown in FIG. 4. While advantage from interlocking stems is not obtained, mushroom stems 26*a* still provide substantial resistance to compressive forces, and protective package 108 is somewhat thinner than protective package 40, 40' of FIG. 1*c*, 1*d*, FIG. 2*d*-2*h*, and FIG. 2*d*'-2*h*' with their interlocking mushroom stems.

Dual lock material 22*a*, 22*b* has advantage in that it is flexible in all directions, so it can be attached to a surface curving in more than one direction, such as a sphere, a vehicle surface, or a body part, such as a foot, a knee, or a hip.

Figure 5B:
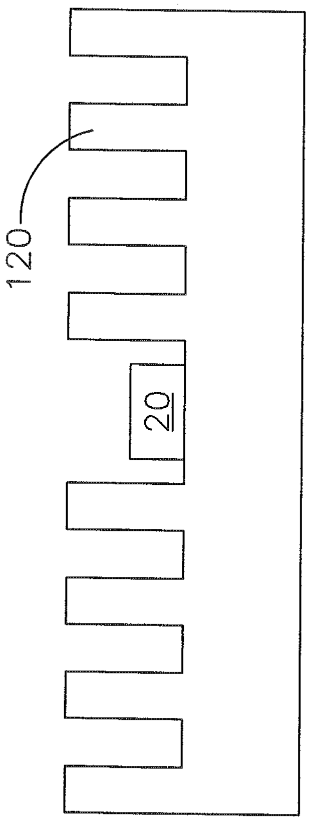
FIG. 5*b* is a cross sectional view of the one layer structure of FIG. 5*a;*
Figure 5A:
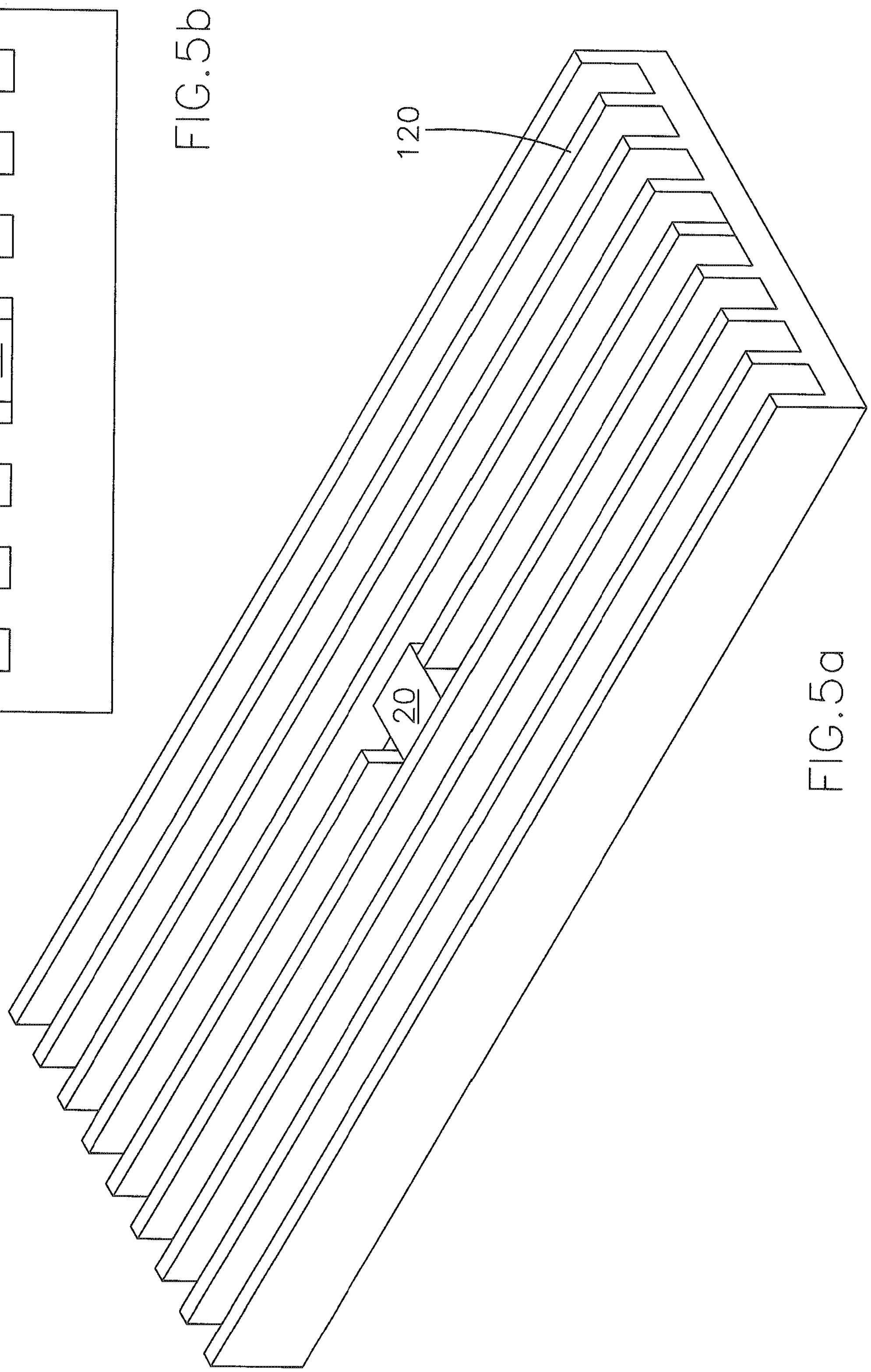
FIG. 5*a* is a three dimensional view of a one layer structure with ribs for providing flexible packaging for an electronic device that may be mounted on a substrate having a one dimensional curvature.

Different structures can be used instead of mushroom stems. For example, a one layer structure with ribs 120 can be used for providing flexible packaging for a substrate with a one dimensional curvature, such as a pipe, as shown in FIG. 5*a*, 5*b*.

Figure 6A:
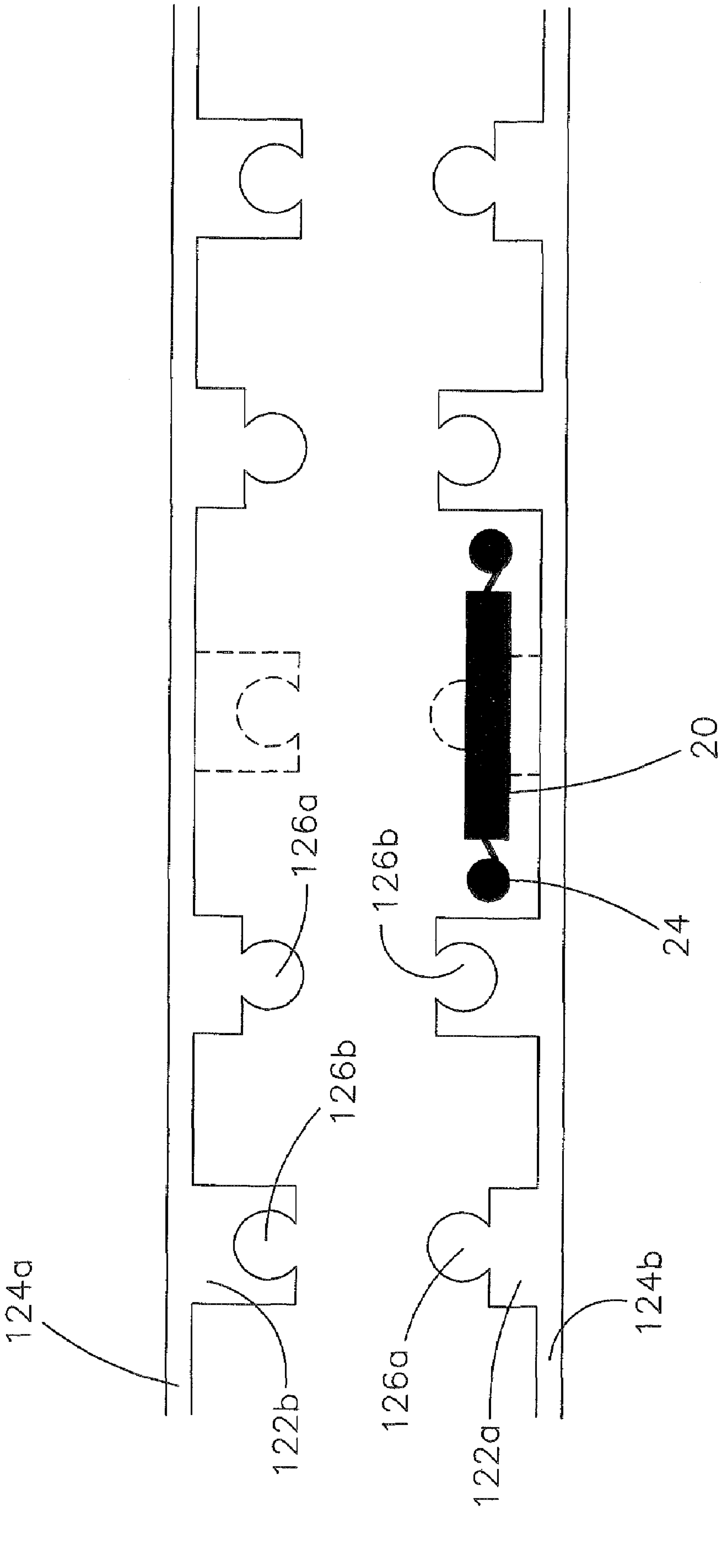
FIG. 6*a* is a cross sectional view of a two layer structure with alternating interlocking ribs for providing flexible packaging for an electronic device that may be mounted on a substrate having a one dimensional curvature.

Alternatively a two layer structure with alternating interlocking ribs 122*a*, 122*b* can be used, as shown in FIG. 6*a*. In this embodiment, alternating interlocking ribs 122*a*, 122*b* allow layers 124*a* and 124*b* to be identical to each other. For interconnecting, layer 124*b* may just be displaced one row of ribs to provide mating alignment. Alternatively, two different layers can be provided, one with extensions like 126*a* on all its ribs, the other with receptacles like 126*b* on all its ribs.

Figure 6B:
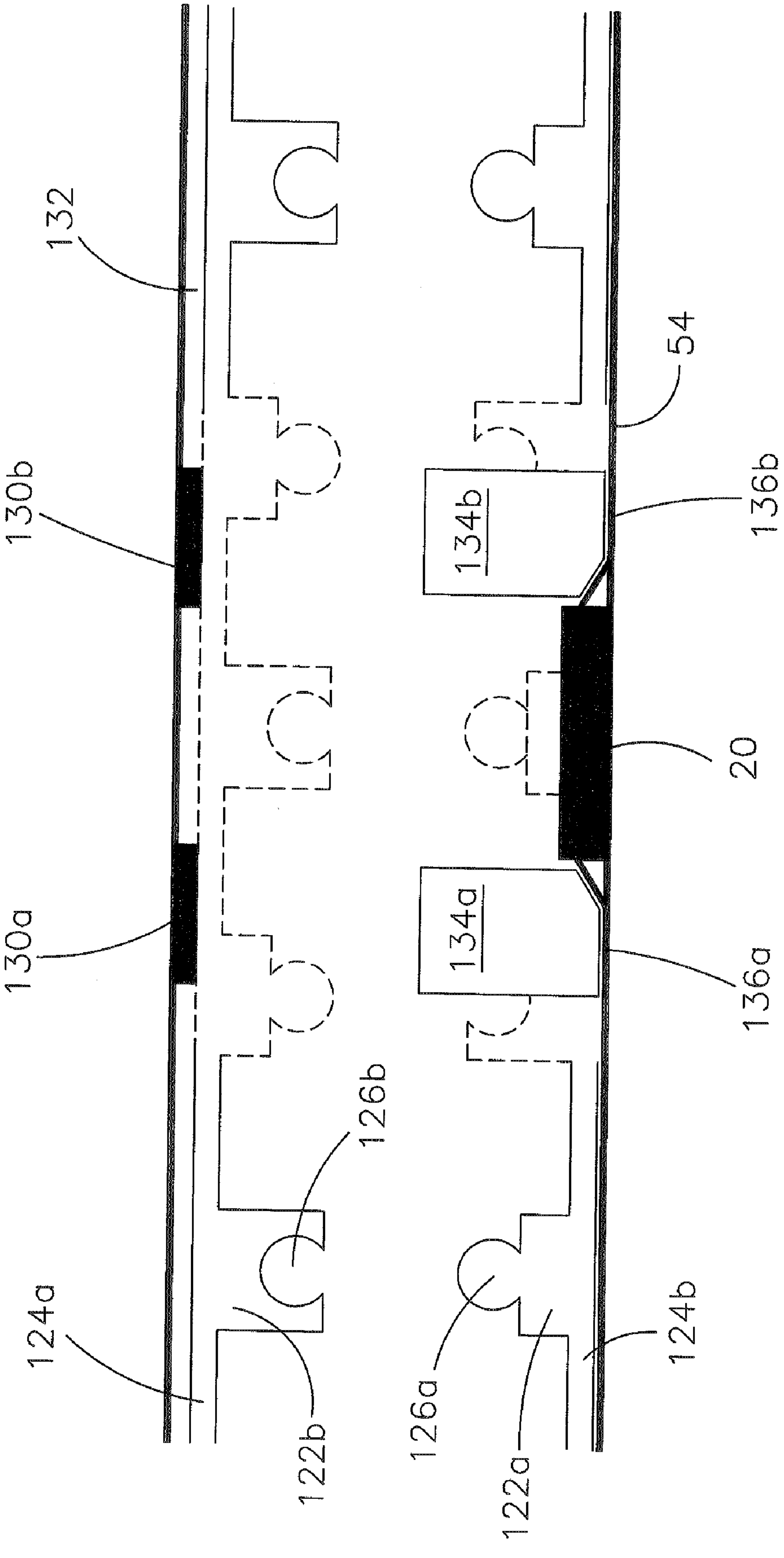
FIG. 6*b* is a cross sectional view of a two layer structure with alternating interlocking ribs for providing flexible packaging for an electronic device on an insulating carrier connected to the bottom layer that is connected to an antenna located on the top layer.

While electronic device 20 is provided on insulating carrier 54 connected to bottom layer 124*b* that will be bonded to pipe 72, antennas 130*a*, 130*b* can be formed on second insulating carrier 132 that is connected to top layer 124*a*, as shown in FIG. 6*b*. Pads 134*a*, 134*b* of conductive elastomer are provided on pads 136*a* 136*b* on insulating carrier 54 to electrically connect antennas 130*a*, 130*b* to electronic device 20.

Other designs for surface elements can be used that still provide a flexible material. For example round extensions 126*a* and round receptacles 126*b*, with cross sections similar to those shown for interlocking ribs 122, can replace mushroom heads on layers of flexible material, as also shown in FIG. 6*a*, 6*b*, except in this case FIG. 6*a*, 6*b* are understood as cross sections through a two dimensional array of stems instead of through rows of ribs. This would better constrain the mushroom heads and provide improved resistance to impact loads and better control of the height of the layered assembly.

Figure 7:
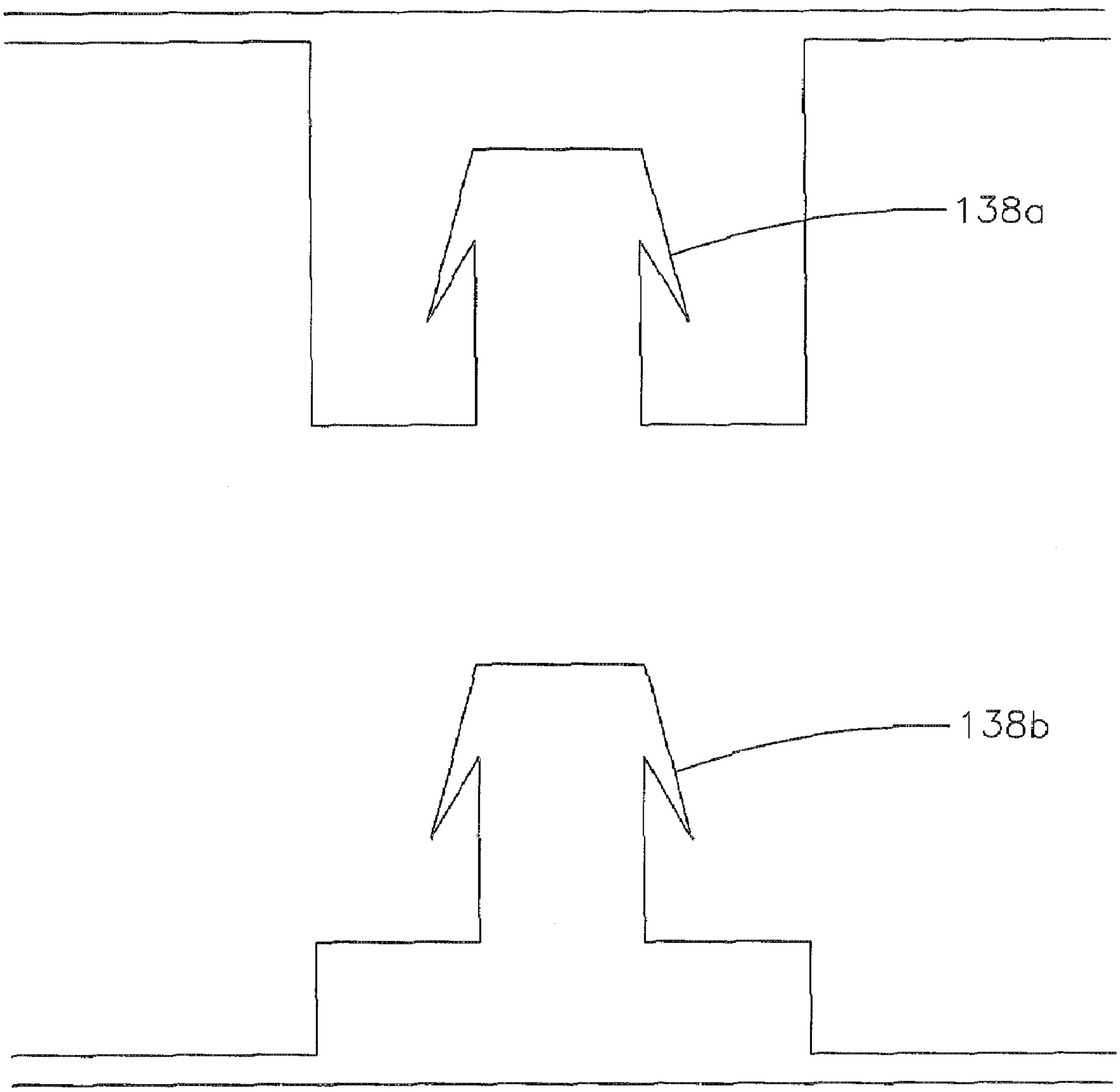
FIG. 7 is a cross sectional view of a two layer structure with interlocking extensions and receptacles that include latches.

Such extensions and receptacles can be designed with latches 138*a*, 138*b*, as shown in FIG. 7, and/or adhesive can be provided between dual layers so that once snapped together the two layers could not be taken apart without destroying it. Tags would then be permanently packaged and mounted and one could detect whether the tag had been tampered with, discouraging theft and counterfeiting attempts.

Figure 8A:
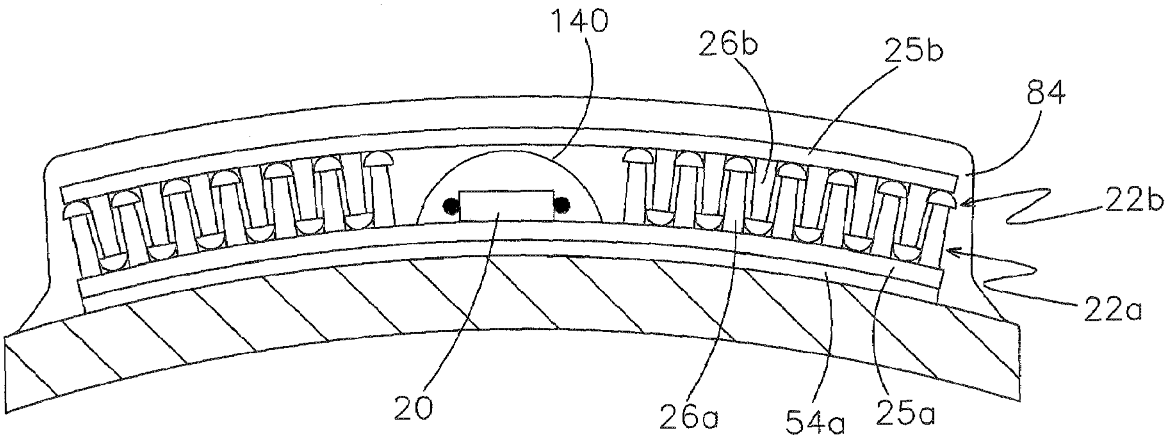
FIG. 8*a* is a cross sectional view of the double layer flexible protective package of FIG. 2*e* but with the electronic device protected by a hard cap.
Figure 8B:
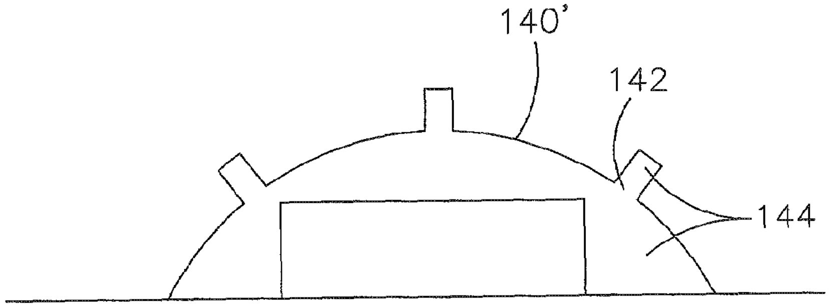
FIG. 8*b* is a cross sectional view of one embodiment of the hard cap of FIG. 8*a*, with openings along its surface so gel provided under the hard cap has room to leave when pressure is applied to the hard cap.
Figure 8A:
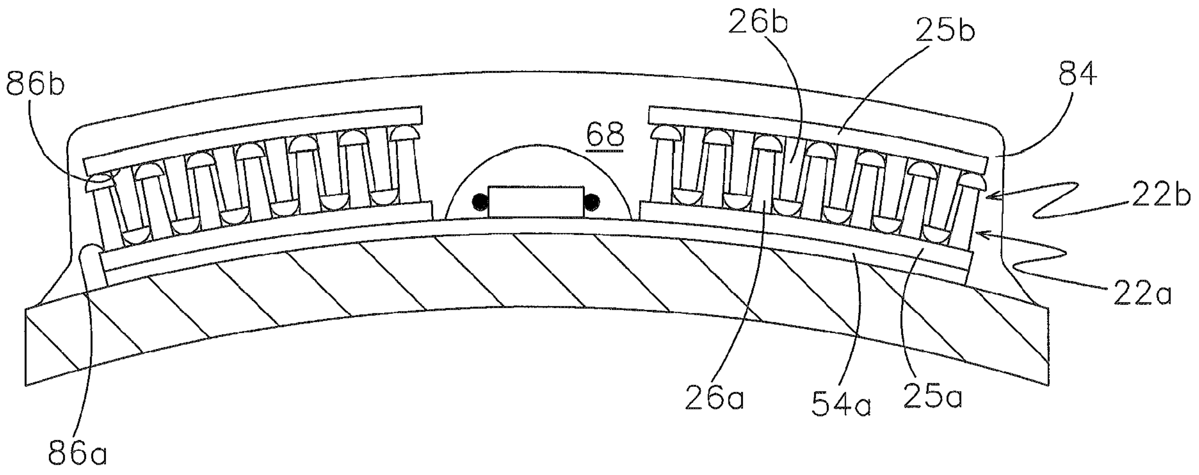

In another embodiment, a dome shaped hard cap 140 can be provided over electronic device 20 to provide additional protection from blows, as shown in FIG. 8*a*. Hard cap 140 can be fabricated of a material, such as epoxy or plastic. Hard cap 140' can have openings 142 along its surface so gel 144 provided under hard cap 140' has room to leave when pressure is applied to hard cap 140' so a reduced force is transmitted to electronic device 20, as shown in FIG. 8*b*. Gel 144 can be fabricated of a material such as room temperature vulcanized rubber, also known as RTV. It can also be "Hi-TAC" polyurethane material from Av-DEC Aviation Devices and Electronic Components, L.L.C., Fort Worth, Tex. A colored gel can be used to make an impact highly detectable.

In FIG. 8*a*' first and second dual lock materials 22*a*, 22*b* are shown pushed together so mushroom stems 26*a*, 26*b* contact front surfaces 86*a*, 86*b* of corresponding planar backing 25*a*, 25*b* of first and second dual lock materials 22*a*, 22*b*. In this position mushroom stems 26*a*, 26*b* strongly resist further compression of first and second dual lock materials 22*a*, 22*b*, providing excellent protection to electronic device 20 in cavity 68.

In normal use, first and second dual lock materials 22*a*, 22*b* may shift apart and together within the constraints of the latches provided by the mushroom caps and the front surfaces of the insulating carriers.

A material, such as polyimide, polyurethane, or silicone rubber provided in the spaces between mushroom stems 26*a*, 26*b* can hold dual lock materials 22*a*, 22*b* in one such position, such as the one shown in FIG. 1*d*.

Damaging blows to the package could be detected by inclusion of a sensor, such as a pressure sensor, along with electronic components for receiving and transmitting the data, as described in the commonly assigned U.S. patent applications listed herein above incorporated herein by reference.

While the disclosed methods and systems have been shown and described in connection with illustrated embodiments, various changes may be made therein without departing from the spirit and scope of the invention as defined in the appended claims.

The invention claimed is:

1. An electronic packaging system, comprising:

an electronic device having a top surface and sides; and a flexible material located adjacent a plurality of said sides of said electronic device, wherein said electronic device is located in a cavity in said flexible material, wherein said top surface is free of said flexible material, wherein said flexible material has a first height and a first width, wherein said electronic device has a second height, wherein said first height is greater than said second height and wherein said first width is greater than said first height so said flexible material protects said electronic device from loading.

2. An electronic packaging system as recited in claim 1, wherein said electronic device includes an RFID chip.

3. An electronic packaging system as recited in claim 1, wherein said electronic device includes an RF transmitter.

4. An electronic packaging system as recited in claim 1, wherein said electronic device includes at least one from the group consisting of a sensor and an actuator.

5. An electronic packaging system as recited in claim 1, wherein said electronic device includes at least one from the group consisting of a transceiver, a microprocessor, and a memory.

6. An electronic packaging system as recited in claim 1, wherein said electronic device includes at least one from the group consisting of an optical transmitter and an acoustic transmitter.

7. An electronic packaging system as recited in claim 1, further comprising a gel, wherein said gel covers said electronic device for protecting said electronic device.

8. An electronic packaging system as recited in claim 1, further comprising a substrate, wherein said electronic device is mounted to said substrate, wherein said substrate includes at least one from the group consisting of a pipe, a girder, an I-beam, a vehicle, a bridge, a building, and machinery.

9. An electronic packaging system as recited in claim 1, further comprising a substrate, wherein said electronic device is mounted to said substrate, wherein said substrate includes a living being.

10. An electronic packaging system as recited in claim 1, further including a moisture barrier positioned to protect said electronic device.

11. An electronic packaging system as recited in claim 10, wherein said moisture barrier includes at least one from the group including wax and a butyl rubber.

12. An electronic packaging system, comprising:

an electronic device having a top surface and sides; and a flexible material located adjacent a plurality of said sides of said electronic device, wherein said flexible material includes an array of surface elements, wherein said electronic device is located in a cavity in said flexible material, wherein said flexible material has a first height and a first width, wherein said electronic device has a second height, wherein said first height is greater than said second height and wherein said first width is greater than said first height so said flexible material protects said electronic device from loading.

13. An electronic packaging system as recited in claim 12, further comprising a first flexible member, said first flexible member including a first portion of said array of surface elements and a first flexible backing, wherein said first portion of said array of surface elements is integral with said first flexible backing.

14. An electronic packaging system as recited in claim 13, further comprising a substrate and an adhesive, wherein said first flexible backing is mounted to said substrate with said adhesive.

15. An electronic packaging system as recited in claim 14, wherein said adhesive includes a UV curable adhesive.

16. An electronic packaging system as recited in claim 13, further comprising a second flexible member, wherein said second flexible member includes a second portion of said array of surface elements and a second flexible backing, wherein said second portion of said array of surface elements is integral with said second flexible backing.

17. An electronic packaging system as recited in claim 16, wherein said first flexible member interlocks with said second flexible member.

18. An electronic packaging system as recited in claim 17, further comprising an adhesive for permanently bonding said first flexible member to said second flexible member.

19. An electronic packaging system as recited in claim 16, wherein surface elements of said first portion of said array of surface elements include a stem and wherein surface elements of said second portion of said array of surface elements include a stem.

20. An electronic packaging system as recited in claim 19, wherein surface elements of said first portion of said array of surface elements include a stem having a mushroom top, and wherein surface elements of said second portion of said array of surface elements include a stem having a mushroom top, wherein said mushroom tops of said first portion of said array interlock with said mushroom tops of said second portion of said array.

21. An electronic packaging system as recited in claim 19, wherein surface elements of said first portion of said array includes a stem having an extension, and wherein surface elements of said second portion of said array include a stem having a receptacle, wherein said extensions of said first portion of said array interlock with said receptacles of said second portion of said array.

22. An electronic packaging system as recited in claim 17, wherein surface elements of said first portion of said array of surface elements include a structure connected to surface elements of said second portion of said array of surface elements.

23. An electronic packaging system as recited in claim 22, wherein surface elements of said first portion of said array of surface elements include a first latching structure and wherein surface elements of said second portion of said array of surface elements include a second latching structure, wherein said first latching structure latches to said second latching structure.

24. An electronic packaging system as recited in claim 13, wherein said flexible member is capable of conforming to a surface curved in a first direction.

25. An electronic packaging system as recited in claim 24, wherein said flexible package is capable of conforming to a surface curved in a second direction perpendicular to said first direction.

26. An electronic packaging system as recited in claim 12, further comprising a substrate and an adhesive, wherein said array of surface elements is mounted to said substrate with said adhesive.

27. An electronic packaging system as recited in claim 26, wherein said adhesive includes a UV curable adhesive.

28. An electronic packaging system as recited in claim 12, further comprising an antenna, wherein said antenna extends through said array of surface elements.

29. An electronic packaging system as recited in claim 13, further comprising a sheet of insulating carrier, wherein said electronic device is mounted to said sheet of insulating carrier.

30. An electronic packaging system as recited in claim 29, wherein said first flexible member includes a hole, wherein said electronic device extends through said hole and wherein said sheet of insulating carrier adheres to said first flexible member.

31. An electronic packaging system as recited in claim 29, wherein said sheet of insulating carrier includes polyimide.

32. An electronic packaging system as recited in claim 29, wherein said sheet of insulating carrier includes patterned metalization.

33. An electronic packaging system as recited in claim 32, wherein said patterned metalization includes a patterned antenna.

34. An electronic packaging system as recited in claim 12, further including a plurality of said electronic devices.

35. An electronic packaging system as recited in claim 34, wherein an array of surface elements surrounds each of said plurality of electronic devices.

36. An electronic packaging system as recited in claim 1, further comprising a hard cap, wherein said hard cap covers said electronic device.

37. An electronic packaging system as recited in claim 36, wherein said hard cap includes an opening, further comprising a gel within said hard cap, wherein said gel can be displaced through said opening if said hard cap is subjected to a force.

38. An electronic packaging system as recited in claim 12, wherein said array is one dimensional, wherein said array includes ribs.

39. A protective system, comprising a hard cap and a gel, wherein said hard cap has an opening, wherein said gel is within said hard cap and wherein a portion of said gel extends to said opening before pressure is applied to said hard cap, wherein said portion can leave through said opening when a pressure is applied to said hard cap.

40. A protective system as recited in claim 39, wherein said cap has a plurality of openings.

41. A protective system as recited in claim 39, wherein said gel includes at least one from the group consisting of vulcanized rubber and polyurethane.

42. A protective system as recited in claim 39, wherein said gel is colored.

43. A protective system as recited in claim 39, wherein said gel fills space between said device and said hard cap.

44. A protective system as recited in claim 39, wherein when said pressure is applied to said hard cap departure of said gel through said opening reduces force transmitted to said device.

45. A protective system as recited in claim 39, wherein said device includes an electronic device.

46. An electronic packaging system, comprising:

an electronic device;

a first flexible backing;

a second flexible backing;

first surface elements mounted to said first flexible backing, wherein said first surface elements extend adjacent sides of said electronic device, wherein said electronic device is located in an area that is free of said first surface elements; and second surface elements mounted to said second flexible backing, wherein said first surface elements are interlocked with said second surface elements, wherein said second surface elements extend adjacent sides of said electronic device.

47. An electronic packaging system as recited in claim 46, wherein each said first surface element and each said second surface element includes a rib.

48. An electronic packaging system as recited in claim 46, wherein each said first surface element and each said second surface element includes a stem.

49. An electronic packaging system as recited in claim 46, wherein said electronic device is located in an area that is free of said second surface elements.

50. An electronic packaging system, comprising:

an electronic device;

a first flexible member, said first flexible member including a first portion of an array of surface elements and a first flexible backing, wherein said first portion of said array of surface elements is integral with said first flexible backing, wherein surface elements of said first portion of said array of surface elements extend from said backing adjacent sides of said electronic device, wherein said electronic device is located in an area that is free of said surface elements.

51. An electronic packaging system as recited in claim 50, wherein each element of said array includes a rib.

52. An electronic packaging system as recited in claim 50, wherein each element of said array includes a stem.

53. An electronic packaging system, comprising:

an electronic device;

a flexible material located adjacent a plurality of sides of said electronic device, wherein said electronic device includes a top surface, wherein said flexible material is located so said top surface is free of said flexible material; and a layer covering said electronic device, wherein said flexible material is configured to prevent loading of said electronic device when said layer is subject to loading.

54. An electronic packaging system as recited in claim 53, wherein said flexible material has a thickness greater than thickness of said electronic device.

55. An electronic packaging system, comprising:

an electronic device;

a flexible material located adjacent a plurality of sides of said electronic device, wherein said electronic device includes a top surface, wherein at least one substance coats said top surface, wherein said at least one substance has a substance thickness, wherein said electronic device has an electronic device thickness wherein said flexible material has a thickness greater than said electronic device thickness plus said substance thickness; and a layer covering said electronic device, wherein said flexible material is configured to prevent loading of said electronic device when said layer is subject to loading.

* * * * *